United States Patent Office  3,420,674
Patented Jan. 7, 1969

3,420,674
PROCESS FOR REMOVAL OF DELETERIOUS ACID COMPONENTS FROM STEAM VOLATILIZED COFFEE
James R. McCartney, New York, N.Y., assignor to General Foods Corporation, White Plains, N.Y., a corporation of Delaware
No Drawing. Continuation of application Ser. No. 509,224, Nov. 22, 1965. This application Oct. 26, 1967, Ser. No. 678,449
U.S. Cl. 99—71                       4 Claims
Int. Cl. A23f 1/08

ABSTRACT OF THE DISCLOSURE

Roasted and ground coffee which has been dearomatized by steaming is subjected to vacuum to remove residual acids and thereby upgrade the flavor of the extract obtained from such coffee.

---

This application is a continuation of Ser. No. 509,224, now abandoned, which application is a continuation-in-part of Ser. No. 270,544 filed Apr. 4, 1963 (now abandoned).

The present invention relates to a process for preparing aromatized soluble coffee extract and more particularly to the enhancement of coffee flavor in such extract by removal of deleterious acids.

The development of present day soluble coffee concentrates has given rise to a need for a dried, water-soluble extract of roasted coffee having a high quality cup flavor comparable to that found in brewed or percolated coffee. However, dried extracts of roasted coffee are notably deficient in flavor values found in brewed coffee due to the necessity for aqueous extraction of the roasted coffee particles and subsequent drying of the aqueous extract to a powder wherein a considerable portion of flavor volatiles are lost. Various methods have been employed in an effort to restore or replace the coffee flavor values lost in such treatment. One such technique involves the atmospheric steam treatment of roasted coffee to separate and remove the volatile coffee aromatics prior to extraction of the coffee solids. The separated volatiles may be treated with an alkaline material to neutralize any deleterious acids released in the steaming operation and the neutralized volatiles then used as a flavor source after separation from the alkaline liquid. The dearomatized extract obtained from the steamed coffee solids may also have its acid content removed by chemical neutralization, the volatiles then combined with the extract, and the mixture dried. However, with the removal of deleterious acids by neutralization a detrimental effect is noted in the cup flavor of the coffee obtained. This appears to be due to salty by-products produced by neutralization. While it appears that the presence of some natural coffee acids is necessary for balanced flavor and that the complete removal of all the acid notes is undesirable, the addition of the neutralized acids is found to given an undesirable flavor to the coffee.

It is an object of this invention to reduce the acid content of the extract obtained from a bed of roasted coffee which has been subjected to an atmospheric steaming operation for removal of volatile aromas.

It has now been discovered that the acid content of the soluble coffee obtained from roasted coffee which has been subjected to an atmospheric steam distillation of aromas may be reduced by a process which comprises the application of a vacuum of 10–25 inches Hg to said coffee for between 5 and 10 minutes, to form acid vapors, removing vapors, discarding said vapors, extracting the coffee and then drying the coffee extract.

Since the undesirable acidic substances are present in the form of acidic vapor and acidic vapor condensate in the coffee bed, it is advantageous to apply the vacuum line to the bottom portion of the coffee bed thereby utilizing the effects of gravity in removing liquid acids which tend to drain to the bottom of the bed. Application of vacuum at both the top and bottom of the coffee bed enables a maximum removal of acidic vapors and acidic condensate while at the same time providing a maximum cooling effect. The acidic vapor which tends to rise to the top of the coffee bed is removed at the top, while the acidic condensate which tends to drain is removed at the bottom of the column.

The bed of de-aromatized coffee particles is subjected to an absolute pressure in the range of 10–25 inches of mercury and preferably 15–20 inches. High vacuum conditions of above 28 inches mercury tend to remove residual aromas remaining in the dearomatized coffee bed while an insufficient vacuum, i.e., 2–5 inches mercury, is not effective in removing a large quantity of the undesired acids. The vacuum should be applied for a period of 5–10 minutes. Application of vacuum for a shorter period of time, i.e., 2–5 minutes, tends to leave acid in the coffee bed while application of vacuum for a longer period of time appears to be ineffective in removing greater amounts of acid while tending to remove desired volatiles not removed by the steaming treatment. Vacuum stripping of acidic substances permits the attainment of a de-aromatized extract having a pH of about 4.9 instead of 4.7. This difference in pH is highly significant with regard to achieving a better flavor.

Generally, the roasted and ground coffee has an initial moisture content of about 3 to 7%, and increases in moisture content and temperature during the atmospheric steaming step until the coffee has achieved a moisture content of 15 to 25% and a temperature of at least 180° F. at the end of the volatilization cycle. Preferably, the coffee bed will be elevated to a temperature above 190° F. but not greater than 230° F. although temperatures as high as 280° F. may be tolerated in the bottom portions of the bed. The temperature of the volatile vapors exiting from the bed will be above 180° F. say 200° to 230° F., preferably 212° F.

While this invention has application to reduction of acid in any steam-aroma removal treatment, it has particular application to a steam distillation treatment similar to that described in Mahlmann 3,132,947. In Mahlmann, steam is introduced at the lower extremity of an elongated percolator column containing a packed bed of roasted and ground coffee particles having a length at least 5 times its width and a particle size distribution wherein at least 90% of said particles are retained on a 40 mesh U.S. Standard Sieve Screen, the coffee is steamed for at least 15 minues to produce an internal reflux and rectification of steam distilled volatile components as steam vapors condense and moisten the coffee particles and the reflux and rectification interface has reached the top of the bed of coffee particles, the resulting vapors which issue from the bed at a temperature of 180° to 230° F. are collected and are condensed at a temperature of 35° to 70° F., and the dearomatized solids are then extracted. In this process, vacuum is applied to the coffee after steaming and before extraction.

The steaming column may be of any shape; however, a cylindrical packed column having a length dimension which is 5 to 20 times its cross-sectional diameter is preferred. By reason of the void spaces presented by the coarse coffee particles, a tortuous path for the ascending vapors is provided. Also, by the transfer of latent heat from the hot ascending vapors to the relatively cold coffee particles, a condensate of steam forms on the large surfaces of the coffee particles and the particles become moistened. If desired, the walls of the column may also be cooled to further aid in internal column condensation of vapors contacting their surfaces. Preferably, the ground coffee particles are initially charged to the column chamber in a cool ambient room temperature, say below 80° F., or once charged are allowed to cool in the chamber.

The aplication of vacuum serves to remove the concentration of acidic vapors and acidic vapor condensate remining in the coffee as a result of the atmospheric steaming operation. Essentially, this vacuum treatment which lasts for a period of 5 to 10 minutes will serve to remove a substantial portion of the degrading acid components, including the acetic acid component. The application of vacuum, in addition to removing the undesirable acid vapors and condensate, serves to cool the entire bed of roasted and ground coffee from a steaming temperature of about 180°–230° to about 130°–140° F. thereby avoiding undesirable heat degradation of the soluble solids contained in the coffee. Thereafter, water-soluble solids are extracted, the condensed volatiles combined with the dearomatized extract and the mixture dried to produce a soluble coffee having reduced acid content. Of course, the removed aromas may be added to the coffee extract after drying, or the extract concentrated prior to adding the aromas. Moreover, the aromas may merely be removed from the coffee without subsequent readdition to the de-aromatized extract.

This invention will now be described by reference to a specific example:

EXAMPLE I

About 1400 pounds of green coffee was introduced into a roaster of the type conventionally employed in the coffee industry. It was roasted for about 18 minutes to a terminal roast temperature of 415° F. to yield approximately 1250 pounds of roasted coffee beans which were then ground to a particle size range whereat 95% remained on a 20 mesh screen (as measured by a U.S. Standard Sieve) and 5% remained on an 8 mesh screen. Approximately 1800 grams of this roasted and ground coffee was used to fill a glass extraction column 36" high and 4" inner diameter. Steam at between ½ to ¾ p.s.i.g. was introduced at the bottom of the column and the steam pressure was maintained within this range throughout the steam flavor volatilization cycle, which lasted approximately 30 minutes. During this cycle aproximately 400 grams of steam was supplied to the column. The input steam entered at the bottom of the column and passed upwardly motivated by the input steam pressure through the void spaces in the bed of coffee particles. The volatile materials passed out of the top of the column and into a single vertical tube condenser which had a surface area of about 54" square. The condenser was cooled by tap water which was passed through ice baths to provide a water temperature of 40° to 50° F. The aromatic volatiles were collected at 40° to 50° F. and at substantially normal atmospheric pressure.

The bed of roasted and ground coffee had an average moisture content at the end of the cycle of about 20% (by weight of the total coffee). At the end of the cycle, the temperature in the region of the vapor products exiting from the top of the column will be in the neighborhood of 215° F. During the flavor cycle approximately 8 ml. per pound of coffee treated are condensed.

Following the removal of the volatile constituents, the roasted and ground coffee was subjected to vacuum treatment using separate vacuum lines at the top and bottom of the elongated column. A vacuum of about 20" of mercury was applied to each line. Vacuum was applied for a period of about 8 minutes in which time the acid vapors were removed by the top vacuum line and acid vapors and acid condensate were removed by the bottom vacuum line. The pH of the extract subsequently obtained from the vacuum stripped coffee was about 4.9. Extract obtained from coffee treated in the same manner but for vacuum stripping had a pH of about 4.7.

The extract was obtained by contacting the roasted and ground coffee with about 5400 gms. of an aqueous coffee extract produced by a plurality of previous separate extractions and having a solids content of approximately 26%. The steam flavor condensate obtained from the top of the column is immediately admixed with the non-aromatic aqueous extract and spray-dried in a spray-drier of conventional design to form a dry free flowing powder. This powder is found to be productive of a balanced flavor coffee beverage possessing desirable cup flavor when reconstituted with boiling water.

While the present invention has been described by reference to a specific example, it is intended to be limited only by the scope of the appended claims.

What is claimed is:

1. A process for reducing the acid content of soluble coffee obtained from roasted coffee which has been subjected to atmospheric steaming for removal of volatile aromas which comprises applying vacuum of 10–25 inches Hg to said coffee, maintaining said vacuum for between 5 and 10 minutes to vaporize acid present in said steamed coffee, removing the acid vapors, discarding said acidic vapors, extracting said steamed coffee to form an aqueous coffee extract, and drying said extract.

2. The process of claim 1 wherein the volatile aromas removed by steaming the roasted coffee are added to the aqueous extract prior to drying.

3. The process of claim 2 wherein at least 90% of the coffee has a particle size greater than 40 mesh U.S. Standard Sieve, said particles being in an elongated bed having a length at least 5 times its width and the volatiles collected are those vaporized from said bed at 180° to 230° F.

4. The process of claim 3 wherein the vacuum is applied to the top and bottom of said bed of coffee.

References Cited

UNITED STATES PATENTS 2,360,342  10/1944  Heyman _____ 99—71
3,132,947  5/1964   Mahlmann _____ 99—71

OTHER REFERENCES

Sivetz, M.; Coffee Processing Technology, vol. 2, p. 45.

MAURICE W. GREENSTEIN, *Primary Examiner.*